[72] Inventor Ray M. Dolby
London, England

[21] Appl. No. 867,454
[22] Filed Oct. 20, 1969
[45] Patented Dec. 28, 1971
[73] Assignee Dolby Laboratories Inc.
New York, N.Y.
[32] Priorities July 21, 1967
[33] Great Britain
[31] 36,466/69;
Nov. 1, 1968, Great Britain, No. 51,985/68

[54] SIGNAL COMPRESSORS AND EXPANDERS
27 Claims, 13 Drawing Figs.

[52] U.S. Cl. .......... 333/14, 179/100.2, 333/17, 179/1 D
[51] Int. Cl. .......... H04b 3/04, H03q 7/06
[50] Field of Search .......... 333/14; 330/96, 123, 124; 179/100.2

[56] References Cited

UNITED STATES PATENTS

| | | | |
|---|---|---|---|
| 3,111,635 | 11/1963 | Skov et al. .......... | 333/14 |
| 3,350,512 | 10/1967 | Percival et al. .......... | 333/14 X |
| 3,379,839 | 4/1968 | Bennett .......... | 333/14 X |
| 3,397,285 | 8/1968 | Golonski .......... | 333/14 X |

*Primary Examiner*—Herman Karl Saalbach
*Assistant Examiner*—Saxfield Chatmon, Jr.
*Attorney*—Roberts, Cushman & Grover

ABSTRACT: Signal compressor or expander action is obtained by passing the signal through a main path which provides an undistorted signal. A further path is tapped off the main path and amplifies and limits the signal. The output of the further path is used to boost or buck the signal in the main path to obtain compressor or expander action. This action takes place in a restricted frequency band defined by a variable filter in the further path, this filter being responsive to the output of the further path to narrow the pass band when this output increases. The filter comprises two filters in cascade, a fixed value filter and a variable filter which includes a voltage-controlled variable resistance. The two filters can be simple RC filters but in combination they give a 12dB/octave cutoff which is important in avoiding noise modulation effects. Various advantageous filter configurations are disclosed.

SIGNAL COMPRESSORS AND EXPANDERS

This invention relates to signal compressors and expanders such as are disclosed in the specifications of my copending applications Ser. No. 569,615 and a continuation-in-part thereof, Ser. No. 789,703. The invention is applicable to both type I and type II devices, as defined in Ser. No. 789,703 and concerns further improvements in devices of the nature disclosed in FIG. 11 of Ser. No. 569,615 and FIG. 3 of Ser. No. 789,703.

The main characteristic of all the devices described in both the above-mentioned specifications is that no attempt is made to establish the required compression or expansion law by operating upon the whole dynamic range of the signal. Rather a main, straight-through signal path is provided, through which signals, and in particular high-level signals, can pass undistorted. With these signals is combined the output of a further path, which can take its input either from the input to or the output from the device. This output, at low-signal levels, either boosts or bucks the main signal to provide compression or expansion, respectively. However, the further path includes a limiter so that, at higher signal levels, the output of this path is negligible compared with the main signal, resulting in minimal boosting or bucking. In this way, a compression or expansion characteristic is derived with substantial avoidance of the severe problems inherent in previously known devices which operate on the whole signal in accordance with a nonlinear law. It is particularly important that compressors and expanders according to the invention can be made truly complementary, so that a complete noise reduction system can be provided which does not itself introduce distortion.

For convenience, idealized block diagrams of type I and type II devices are shown in FIGS. 1 and 2 of the accompanying drawings.

It is well known that noise reduction is desirably effected selectively throughout a signal band, e.g., an audio band, usually in an upper band and/or a lower band of the overall signal band. The aforementioned FIG. 11 concerns the use of a further path with a variable cutoff filter which restricts the compression or expansion to an extreme (i.e., high-pass or low-pass) band of the signal band. As the output amplitude of the signal passed by the filter increases, the cutoff frequency is automatically shifted nearer to the relevant extreme of the signal band; the pass band of the filter is thereby narrowed, so allowing noise reduction still to take place within this narrowed band without being influenced by the larger amplitude signals excluded by the shift of the filter cutoff frequency.

THE INVENTION

The present invention is concerned with an improved filter configuration in the further path enabling suitable variable cutoff characteristics to be obtained while requiring only a single-voltage controlled variable resistance device for varying the cutoff frequency.

The present invention provides a signal compressor or expander comprising a straight-through signal path and means for combining with the signals therein, so as either to boost or buck such signals, the output signal of a further path which takes its input either from the input to or the output from the compressor or expander and which includes both means for limiting the amplitude of the said output signal and a variable cutoff filter for restricting signals passing through the further path to a restricted band extending to one limit of the overall signal band, the variable filter being responsive to the amplitude of the output thereof to shift the cutoff frequency nearer to the said one limit of the signal band as the said amplitude increases, the filter configuration comprising two filters in cascade, namely a first filter comprising fixed-value components and a second filter with a variable cutoff frequency which, under quiescent conditions, lies further from the said one limit than the cutoff frequency of the first filter, the second filter including a voltage controlled variable resistance device responsive to the said amplitude to vary the parameters of the filter and shift the variable cutoff frequency towards the said one limit.

The variable resistance device is preferably a field effect transistor.

The advantages of the invention will become clear in the following description of detailed embodiments of a compressor and an expander. These embodiments are type I devices, but essentially the same circuitry could be employed in the different configurations appropriate to type II devices. These embodiments are designed for operation at the upper end only of the audio signal band, as they are intended for use in conjunction with domestic tape recorders. Thus the said one limit of the signal band is the upper limit of the band. The invention could equally be employed at the lower end of the audio band (the relevant said one limit being the lower limit of the band) in which case the high-pass filters hereinafter described would have to become low-pass filters (with appropriate redesign of the circuit throughout). The invention is furthermore not limited to audio applications, and it will be appreciated that the following description is throughout by way of example.

THE DRAWINGS

BACKGROUND

Figure 1:
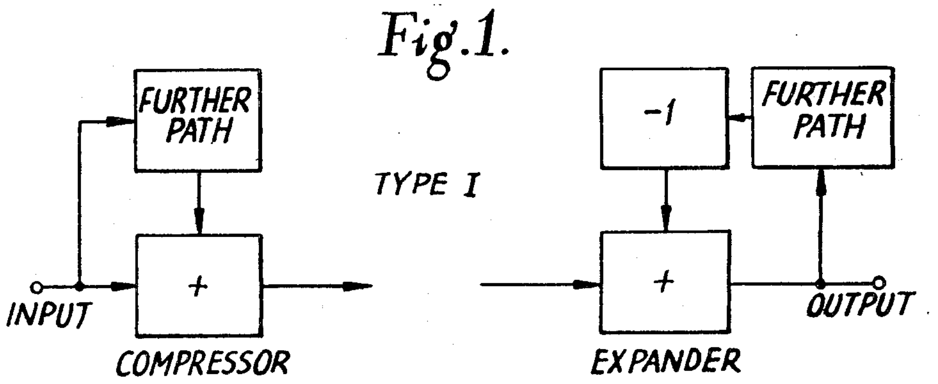
FIGS. 1 and 2 are the aforementioned diagrams of type I and II devices.
Figure 2:
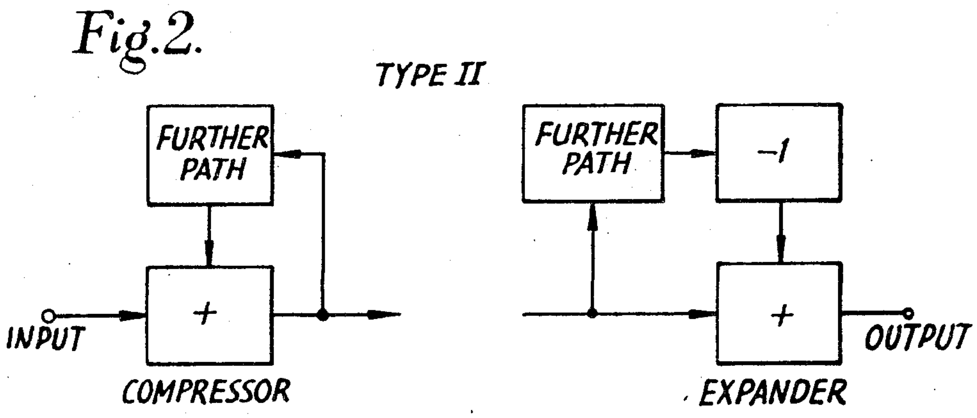
Figure 3:
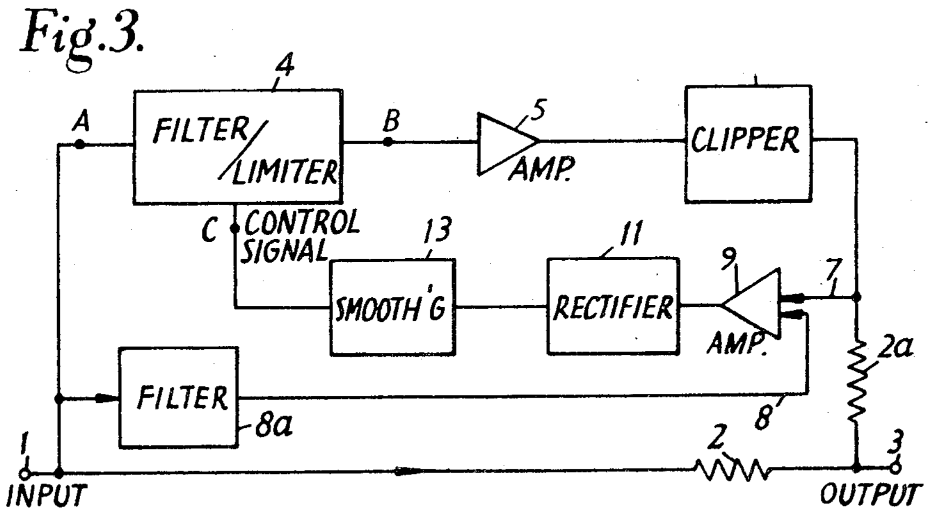
FIG. 3 is a more detailed block diagram of a type I sliding band compressor.

FIGS. 1, 2 and 3 all relate generically to the improvements in the previously mentioned specifications as well as to the present invention. FIGS. 1 and 2 have already been described. FIG. 3 shows a type I sliding band compressor in more detail; the expander and type II variants will be apparent from FIGS. 1 and 2.

In FIG. 3 the input signal applied to a terminal 1 passes through a resistor 2, constituting the main path, to be summed at an output terminal 3 with the signal from the further path provided through a resistor 2*a*. The further path comprises a filter/limiter 4 with input A and output B, followed by an amplifier 5 and clipper 6, which eliminates any transient overshoots remaining in the signal passed by the essentially syllabic limiter 4. The syllabic action is obtained by applying a smoothed control signal to a control terminal C of the filter/limiter 4. This control signal is derived from the output and/or input of the further path (lines 7 and 8 of which only one need be provided) via an amplifier 9, rectifier 11 and smoothing circuit 13. A filter 8*a* may also be provided in line 8. When the control signal increases in amplitude, it narrows the pass band of the filter/limiter 4.

A COMPRESSOR EMBODYING THE PRESENT INVENTION

Figure 4:
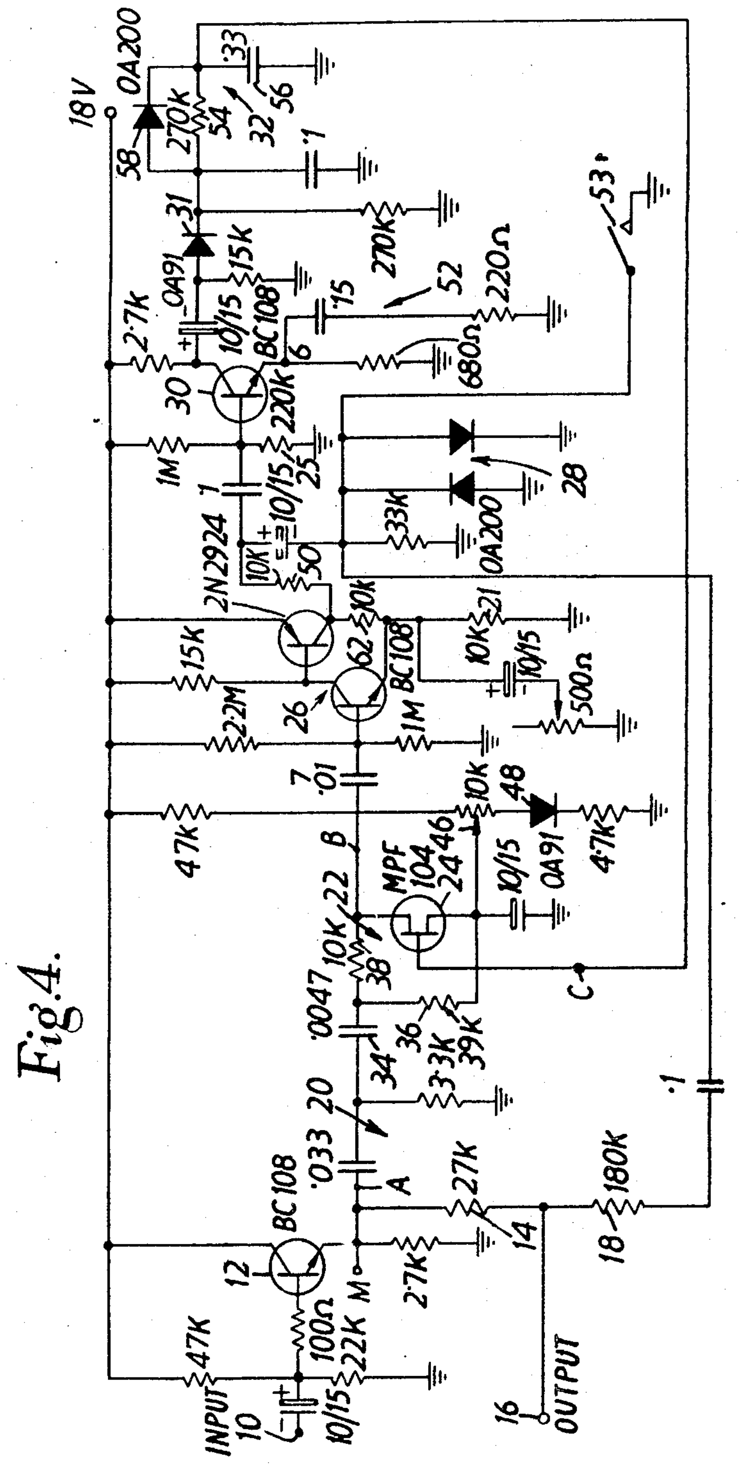
FIG. 4 is a circuit diagram of a compressor embodying the present invention.

The circuit of FIG. 4 is specifically designed for incorporation in the record channel of a domestic tape recorder, two such circuits being required for a stereo recorder. The input signal is applied at terminal 10 to an emitter follower stage 12 which provides a low-impedance signal. This signal is applied firstly through a main, straight-through path constituted by a resistor 14 to an output terminal 16 and secondly through a further path the last element of which is resistor 18 also connected to the terminal 16. The resistors 14 and 18 add the outputs of the main and further paths to provide the required compression law.

The further path consists of a fixed filter 20, a variable cutoff filter 22 including a FET 24 (these constituting the filter/limiter), and an amplifier 26 the output of which is coupled to a double diode limiter or clipper 28 and to the resistor 18. The amplifier 26 increases the signal in the further path to a level such that the knee in the characteristic of the limiter 28, comprising silicon diodes, is effective at the appropriate signal level under transient conditions. The resistors 14 and 18 are so proportioned that the required compensating degree of attenuation is then provided for the signal in the further path.

The output of the amplifier 26 is also coupled to an amplifier 30 the output of which is rectified by a germanium diode 31 and integrated by a smoothing filter 32 to provide the control voltage for the FET 24. The points A, B and C are marked in correspondence with FIG. 3.

THE FILTER/LIMITER

Two simple RC filters are used, though equivalent LC or LCR filters could be used. The fixed filter 20 provides a cutoff frequency of 1,700 Hz., below which diminishing compression takes place. The filter 22 comprises a series capacitor 34 and shunt resistor 36 followed by a series resistor 38 and the FET 24, with its source-drain path connected as a shunt resistor. Under quiescent conditions with zero signal on the gate of the FET 24, the FET is pinched off and presents substantially infinite impedance; the presence of the resistor 38 can then be ignored. The cutoff frequency of the filter 22 is thus 800 Hz., which it will be noted is substantially below the cutoff frequency of the fixed filter 20.

When the signal on the gate increases sufficiently for the resistance of the FET to fall to less than say 1 K, the resistor 38 effectively shunts the resistor 36 and the cutoff frequency rises to 3,500 Hz., markedly narrowing the pass band of the filter. The rise in cutoff frequency is of course a progressive action.

The use of a FET is convenient because, within a suitably restricted range of signal amplitudes, such a device acts substantially as a linear resistor (for either polarity signal), the value of which is determined by the control voltage on the gate.

Figure 8:
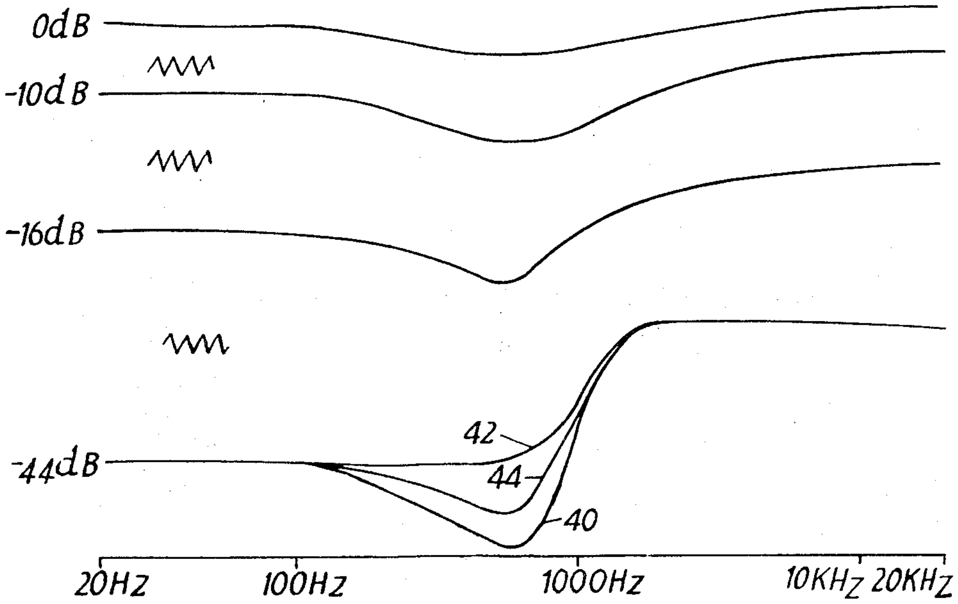
FIGS. 8 and 9 show characteristic curves of the compressor.

The use of two cascaded filters (12 db./octave) is important because this results in less noise modulation than a simple one-stage variable cutoff frequency filter (6 db./octave). However, the phase delay, varying as a function of frequency, produced by two filters in cascade is such as to give a compression versus frequency characteristic as is illustrated in FIG. 8 by curve 40 for an input signal 44 db. down on a peak input taken as 0 db., rather than the desired shape of curve 42. By putting the quiescent cut off of the filter 22 well below that of the filter 20 it is possible to achieve a compromise such as curve 44, which is based on an actual measurement and in which the high-frequency end is about 10 db. up on the low-frequency end. Curves for inputs at −16 db., −10 db. and 0 db. are also shown to illustrate how the compression action is progressively lessened as the input amplitude increases and the band of the filter 22 narrows. In the drawing shown, the curves are closed together in the vertical scale more than they are in actuality.

Figure 9:
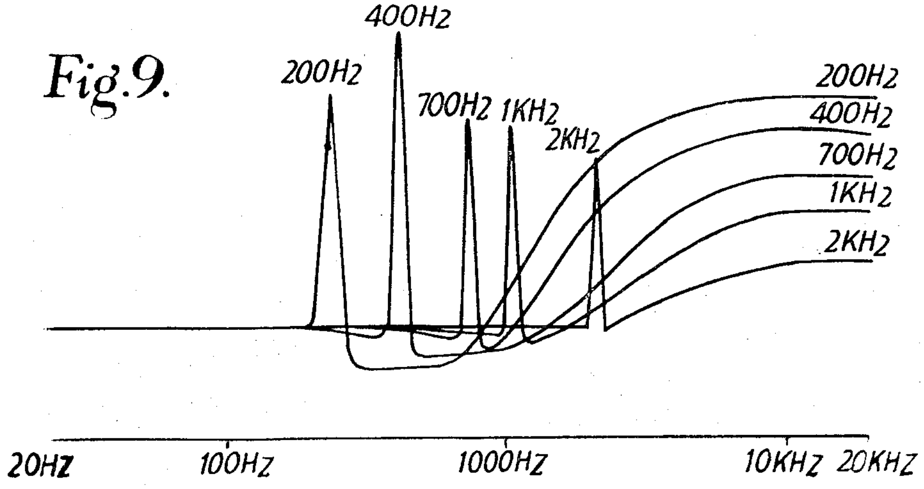

The variable band action is illustrated more clearly by the curves of FIG. 9, which show the results of putting a strong (0 db.) signal at a fixed frequency on the input terminal 10 and superimposing a weak (−41 db.) signal which is swept through the whole frequency spectrum. The output on terminal 16 at the frequency of the weak signal is detected by a wave analyzer and naturally exhibits a strong signal at the frequency of the fixed frequency strong input and also exhibits the high frequency lift provided by the compression action. It can be clearly seen how the increasing frequency of the strong signal (200 Hz., 400 Hz., 700 Hz., 1 kHz., 2 kHz.) gradually narrows the band within which compression takes place.

Returning to the description of FIG. 4, the resistor 36 and FET 24 are returned to an adjustable tap 46 in a potential divider which includes a temperature compensating germanium diode 48. The tap 46 enables the compression threshold of the filter 22 to be adjusted.

AMPLIFIER AND LIMITER

The amplifier 26 comprises complementary transistors giving high-input impedance and low-output impedance. Since the amplifier drives the diode limiter 28, a finite output impedance is required and is provided by a coupling resistor 50. The diodes 28 are, as already noted, silicon diodes and have a sharp knee around ½ volt.

The signal on the limiter and hence on the resistor 18 can be shorted to ground by a switch 53 when it is required to switch the compressor out of action.

CONTROL AMPLIFIER AND SMOOTHING FILTER

The amplifier 30 is an NPN transistor with an emitter time constant network 52 giving increased gain at high frequencies. Strong high frequencies (e.g., a cymbal crash) will therefore lead to rapid narrowing of the band in which compression takes place, so as to avoid signal distortion.

The amplifier is coupled to the smoothing filter 32 through the rectifying diode 31. The filter comprises a series resistor 54 and shunt capacitor 56. The resistor 54 is shunted by a silicon diode 58 which allows rapid charging of the capacitor 56 for fast attack, coupled with good smoothing under steady-state conditions. The voltage on the capacitor 56 is applied directly to the gate of the FET 24.

THE COMPLEMENTARY EXPANDER

Figure 5:
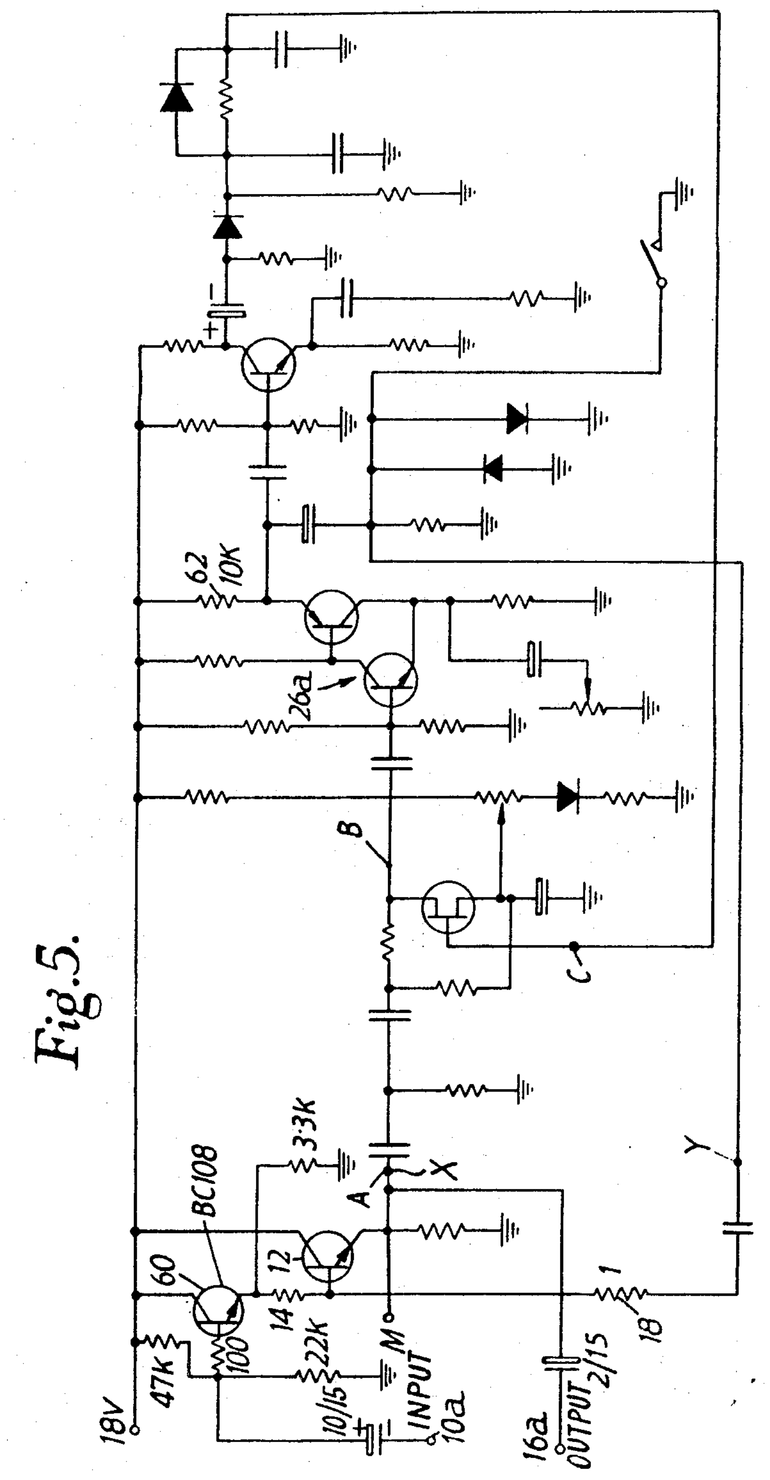
FIG. 5 is a circuit diagram of a complementary expander.

A complete circuit diagram is provided in FIG. 5, but a full description is not required as substantially all the circuit is identical to FIG. 4; component values are therefore not for the most part shown in FIG. 5. The characteristic curves, although not shown, are complementary to those of FIG. 8.

The differences between FIGS. 4 and 5 are as follows:

In FIG. 5 the further path derives its input from the output terminal **16*a*, the amplifier 26*a* is inverting, and the signals combined by the resistors 14 and 18 are applied to the input (base) of the emitter follower 12, the output (emitter) of which is coupled to the terminal 16*a*. To ensure low driving impedance, the input terminal 10*a* is coupled to the resistor 14 through an emitter follower 60**. Suitable measures must be taken to prevent bias getting into the expander.

The amplifier **26*a* is rendered inverting by taking the output from the emitter, instead of the collector, of the second (PNP) transistor. This alteration involves shifting the 10 K resistor 62 (FIG. 4) from the collector to the emitter (FIG. 5), which automatically gives a suitable output impedance for driving the limiter. The resistor 50 is therefore omitted in FIG. 5**.

It should be noted that it is important in aligning a complete noise reduction system to have equal signal levels on the emitters of the transistors 12 in both compressor and expander. Metering terminals M are shown connected to these emitters.

SWITCHED COMPRESSOR/EXPANDER

In a high-quality tape recorder, a separate compressor and expander can be provided in the record and playback channels respectively. However, a more economical proposition is to utilize a single compressor/expander with a mode switch for selecting the compressor or expander configuration. The further path for this compressor/expander can be as shown in FIG. 5–i.e., everything to the right of the points X and Y in FIG. 5 is used unchanged, but the circuitry to the left of points X and Y is changed as shown in FIG. 6.

Figure 6:
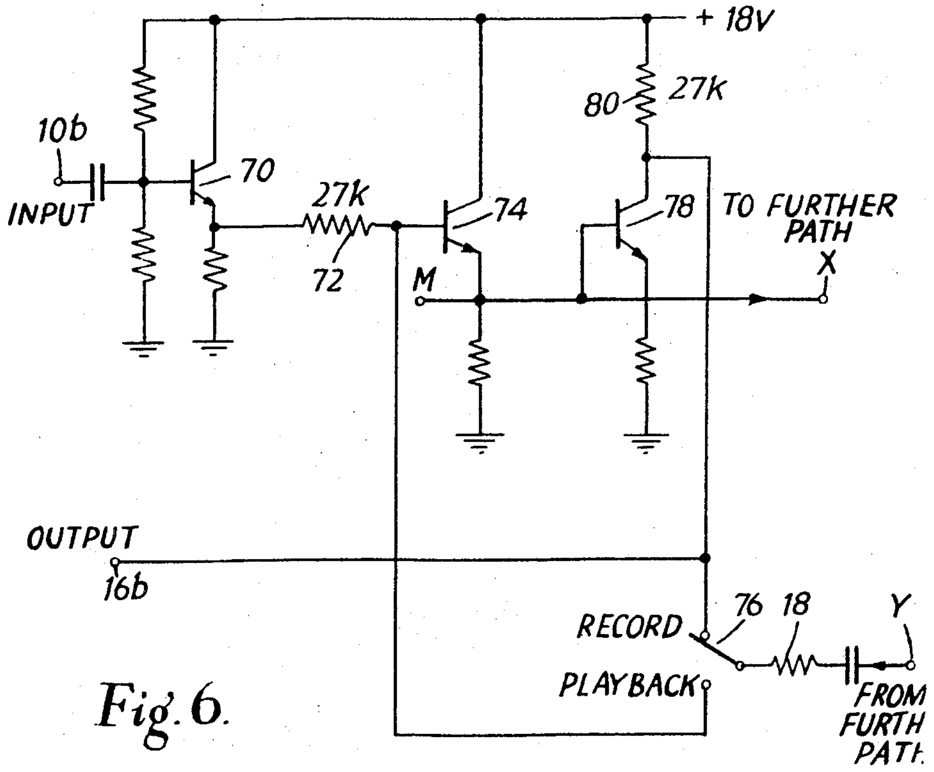
FIG. 6 is a partial circuit diagram of a switched compressor/expander.

In FIG. 6 the input signal on terminal **10*b* is applied to a first emitter follower stage 70, the output of which is applied through a resistor 72 to another emitter follower stage 74 (corresponding to the stage 12 of FIGS. 4 and 5). The emitter of this stage is connected to the point X to provide the noninverted input to the further path. It will be recalled from the description of FIG. 5 that, in this embodiment, the further path effects inversion. Accordingly the signal received at the point Y, and applied in the record mode by a mode switch 76 to the output terminal 16*b* through the resistor 18, is an inverted signal. To obtain compressor action, the main path must also effect inversion, which is achieved by means of a further transistor 78 with its base driven from the emitter follower 74. The main path signal is taken from a collector load resistor 80**.

In the playback (i.e., expander) configuration, the signal from the further path is applied by the switch 76 to the base of the emitter follower 74, i.e., before the inverter stage 78. The signal from the further path therefore combines subtractively with the signal in the main path to give expander action.

SIMPLE EQUALIZATION

Figure 7:
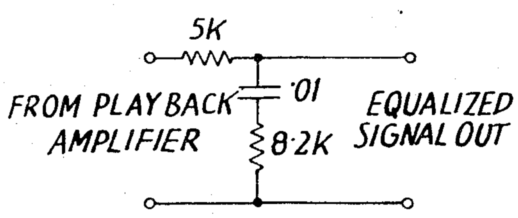
FIG. 7 shows a simple passive equalizing network.

The compressor and expander are provided for incorporation in a high-quality tape recorder, permitting the user thereof to record and replay his own tapes with noise reduction. Such a tape recorder can obviously also play back prerecorded tapes which have been recorded using the compressor of FIG. 4 or a compressor with like characteristics. In order to make it possible for such tapes to be marketed for universal consumption it is desirable to provide a cheaper means of equalizing the signal for incorporation in less expensive recorders. Only by the use of a complementary expander can an undistorted signal be recovered but, to the uncritical ear, the only noticeably defect in the compressed signal is an undue emphasis of high frequencies. This emphasis can be approximately corrected by a simple, passive, treble cut circuit (which acts upon the whole signal). One suitable circuit is illustrated in FIG. 7, the component values being suitable for equalizing a signal recorded through the compressor of FIG. 4.

FURTHER IMPROVEMENT OF THE FILTER/LIMITER

In the simplified audio noise reduction system as so far described, it has been pointed out that the filter/limiter circuit used represents a compromise. For best noise reduction results, especially with regard to noise modulation effects, it is necessary to use a further path filter which has an attenuation rate of at least 12 db. per octave. The high-pass filter required for hiss reduction is conveniently obtained by the use of the two section cascaded RC network. The last capacitor is paraleled by the FET 24 which can shift the cutoff frequency of the last section upwards to effect limiting of the signal.

Unfortunately, the phase shift produced by the two section filter results in a midband dip in the compressor frequency response. The disadvantages or inconveniences of the dip include an increase in noise level in the few hundred Hertz region (as opposed to noise reduction) and a disparity in signal level (about 1 db.) in the 1 kHz. region at high levels when the further path component is switched on and off (noise reduction on-off). An improved filter/limiter circuit is now described which overcomes the midband dip problem and also results in other advantages, notably in decreased dynamic and frequency response errors under conditions of imperfect compressor and expander matching.

Figure 10:
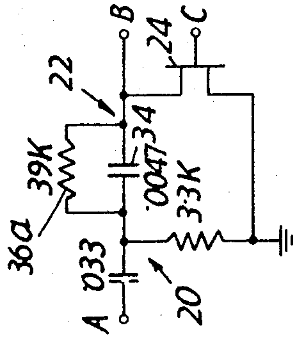
FIG. 10 is a circuit diagram of an improved filter/limiter.

FIG. 10 shows the improved circuit, for replacing the circuit between points A, B and C in FIGS. 4 and 5. When the FET 24 is pinched off, the second RC network 22 is inoperative, and the first RC network 20 then controls the response of the further path. The improved circuit combines the phase advantages of having only a single RC section under quiescent conditions with the 12 db. per octave attenuation characteristics of a two-section RC filter under signal conditions.

In the practical circuit, using MPF104 FET's, the 39 K resistor **36*a* is necessary in order to provide a finite source impedance to work into the FET. In this way the compression ratio (decibel changes in the input divided by decibel changes in the compressor output) at all frequencies and levels is held to a maximum of about 2. The 39 K resistor 36*a* serves the same compression ratio limiting function in the improved circuit as the resistor 36 in the circuit of FIG. 4 or FIG. 5**. In addition this resistor provides a low-frequency path for the signal.

Figure 12:
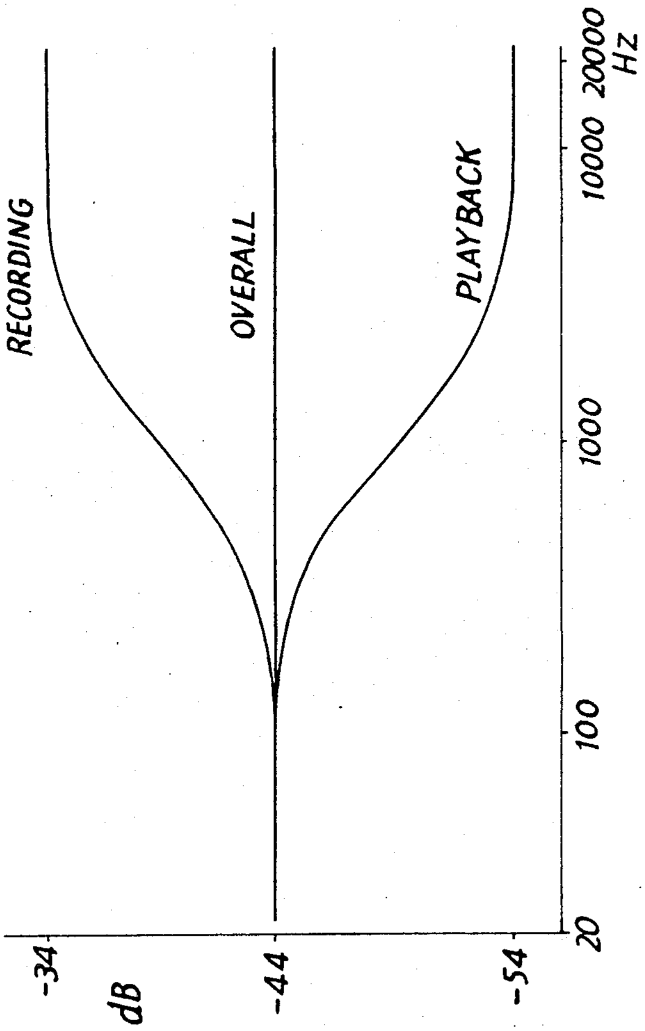
FIGS. 11 to 13 show characteristic curves relating to the embodiment of FIG. 10.
Figure 11:
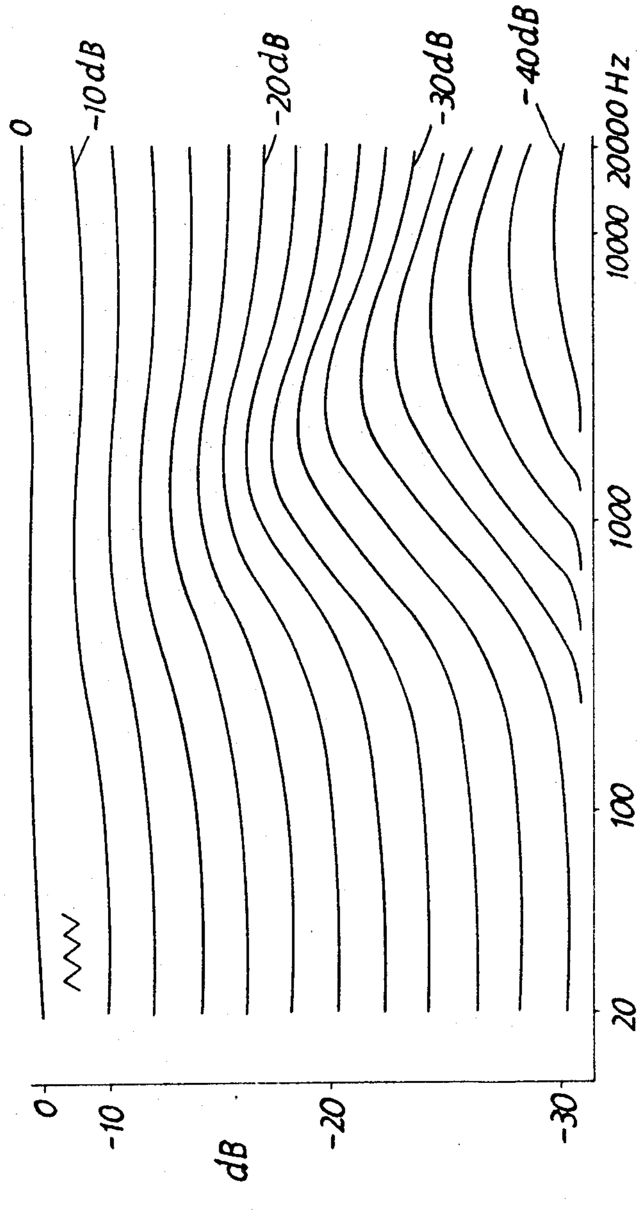

FIG. 11 is a chart recording of the input-output response of the compressor as a function of frequency using the improved filter/limiter of FIG. 10 and the values 47 ohms and 0.1 $\mu$F. in the emitter time-constant circuit 52 of the control amplifier, instead of the values of 220 ohms and 0.15 $\mu$F. shown in FIG. 4. FIG. 12 is a plot of the response of the circuit below the compression threshold; the expander response is also shown.

It can be seen that with the circuit of FIG. 10 the midband dip of FIG. 8 is absent. The tendency for the noise reduction system to increase the noise level in the region of the dip is eliminated, and an improved overall noise reduction effect is thereby achieved. The elimination of the dip at high levels should also be noted. Thus, when the noise reduction action is switched on and off, there will be no change in level and therefore no ambiguities in measuring or specifying levels for standardization purposes. The high-level dip elimination is brought about by the favorable phase characteristics of the improved circuit under high-compression conditions, notably by the provision of a low and midfrequency path by the resistor **36*a*. By adjusting the value of the 39 K resistor 36*a* in the second RC network 22** it is possible to achieve either a dip or a hump in the midfrequency region.

A further aspect of the improved circuit of FIG. 10 is that it is possible to achieve greater effective limiting of the further path component at high frequencies without adversely affecting the matching characteristics. The improved performance is brought about by the leading phase shift introduced at high frequencies by the fully sliding band circuit. In addition, the gain of the control amplifier is increased at high frequencies. The reduction in threshold and the increased compression at high frequencies can be seen in FIG. 11. The characteristics shown result in minimal possibility of tape overload at short wavelengths, although the limiting threshold level is progressively increased with decreasing frequency in order to reduce noise modulation effects.

A further aspect of the improved circuit also concerns noise modulation effects. In the circuit of FIG. 4, the variable band action changes to normal compression when the FET resistance decreases below that of the 10 K resistor 38 in series with the FET. The highest turnover frequency of the variable filter is high enough to provide acceptably low-noise modulation effects under normal tape-recording noise levels. Cassettes, however, have very high-noise levels and it has been found best to eliminate the 10 K resistor 38 and to depend solely on the sliding band action to effect limiting. The further path then has better high-frequency transmission in the presence of high amplitude, lower frequency signals (which necessarily cause the circuit to operate).

Figure 13:
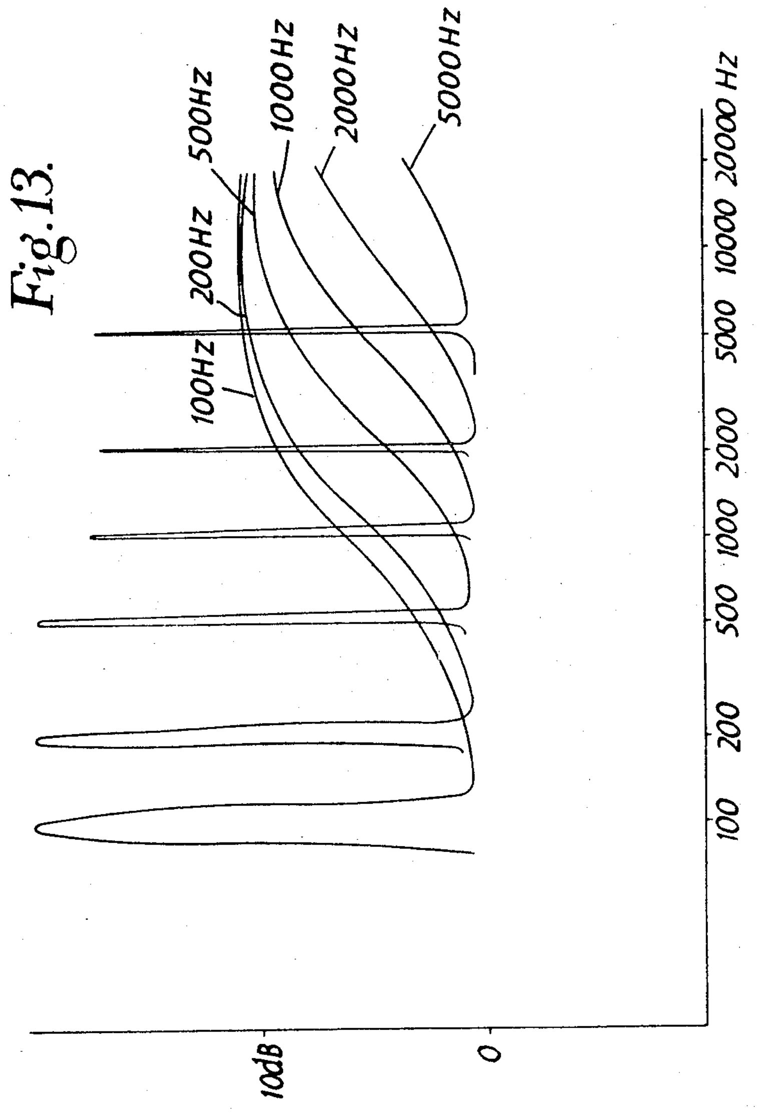

The variable band action of the improved circuit can be seen in FIG. 13, which is produced in the same manner as FIG. 9 by plotting the compressor frequency response by means of a low-level probe tone (the level of which is below the compressor threshold) in the presence of a high-level signal; the probe is detected at the compressor output by means of a tracking filter. The high-level signal causes the compressor circuitry to operate, the graph showing the effect on the turnover frequency of the filter. It can be seen that the variable band circuitry, particularly if using the fully sliding configuration, will provide a significant reduction of high frequency noise under signal conditions. FIGS. 11, 12 and 13 are all taken from actual chart recordings obtained from the improved circuit of FIG. 10.

A correctly adjusted compressor and expander pair should match at all levels and frequencies to within about ±1 db.; experimental results have shown this to be attainable at all signal levels. In practice it is important that the errors produced under mismatch conditions should not noticeably affect the quality of reproduction. The errors produced by the improved filter/limiter circuit of FIG. 10 are less than in the circuit of FIG. 4. It has been shown experimentally that a 2 db. gain or loss between the compressor and expander results in errors such that the change in response as a function of frequency reaches a maximum rate of only about 2–3 db. per octave, which is low enough to avoid introducing any significant coloration into the reproduced signal.

I claim:

1. A signal processing system for producing an output signal in response to an input signal comprising a main signal path responsive to said input signal and including means for providing in a specified frequency band extending between first and second limits a first signal substantially proportional to said input signal;

a further signal path coupled to said main signal path and responsive to a signal derived from said main signal path for producing a second signal in said specified frequency band, and signal combining means for combining said first and second signals to produce said output signal, said further signal path including a first filter having fixed value components for providing pass characteristics in a fixed band extending from said first limit to a cutoff frequency intermediate said first limit and said second limit; and means for limiting the amplitude of the output signal of the further signal path; said means including a second filter connected in cascade with said first filter and having variable cutoff characteristics, said second filter including a variable impedance means responsive to an increase in the amplitude of at least one of the output of and the input to said further signal path for altering said cutoff characteristics from wide band pass under very low input signal conditions to progressively narrower band pass, providing a cutoff frequency which shifts away from said second limit sufficiently to attenuate, in combination with the said characteristics of said first filter, any high-level input signal components at any given frequency in said specified frequency band to a specified level corresponding in said second signal to a small fractional part of the maximum level of said input signal, while permitting input signal components below said specified level at frequencies nearer to said first limit then said given frequency to pass through said filters and to appear in said second signal with a lesser degree of attenuation.

2. A signal processing system according to claim 1 wherein the variable impedance means is field effect transistor.

3. A signal processing system according to claim 1 wherein the first filter is a single section RC filter.

4. A signal processing system according to claim 1 wherein the second filter comprises a series arm consisting of a capacitor in parallel with a resistor and a shunt arm comprising a variable resistance device.

5. A signal processing system according to claim 1 wherein the second filter includes a series capacitor followed by a shunt resistor followed by a further shunt arm comprising a variable resistance device.

6. A filter according to claim 4 wherein the variable resistance device is a field effect transistor.

7. A filter according to claim 5 wherein the variable resistance device is a field effect transistor.

8. A signal processing system according to claim 1 wherein said signal combining means additively combines said first signal and said second signal, whereby said signal processing system operates as a compressor.

9. A signal processing system according to claim 1 wherein said signal combining means subtractively combines said first and said second signals whereby said signal processing system operates as an expander.

10. A signal processing system according to claim 8 wherein said further signal path is responsive to said input signal.

11. A signal processing system according to claim 8 wherein said further signal is responsive to said output signal.

12. A signal processing system according to claim 9 wherein said further signal path is responsive to said input signal.

13. A signal processing system according to claim 9 wherein said further signal path is responsive to said output signal.

14. A signal processing system according to claim 1 wherein said further signal path further comprises a nonlinear limiter in cascade with and following said first and second filters for clipping transients in said second signal.

15. A signal processing system according to claim 1 comprising switch means for selecting the compression or expansion operating mode of said system, said switch means selectively effecting signal connections whereby for compression mode said further signal path is responsive to said input signal and said combining means combines said first and second signals additively and whereby for expansion mode said further signal path is responsive to said output signal and said combining means combines said first and second signals subtractively.

16. A signal processing system according to claim 11 comprising switch means for selecting compression or expansion operating mode of said system;

said main signal path including subtractive combining means followed by additive combining means;

said further signal path being responsive to the output of said subtractive combining means; and said switch means coupling said second signal to said additive combining means for compression mode and to said subtractive combining means for expansion mode.

17. A signal processing system according to claim 1 comprising switch means for selecting the compression or expansion operating mode of said system, said switch means effecting signal connections whereby for compression mode said further signal path is responsive to said output signal and said combining means combines said first and second signals additively and whereby for expansion mode said further signal path is responsive to said input signal and said combining means combines first and second signals subtractively.

18. A signal processing system according to claim 1 comprising switch means for selecting the compression or expansion operating mode of said system;

said main signal path including additive combining means followed by subtractive combining means;

said further signal paths being responsive to the output of said additive combining means; and said switch means coupling said second signal to said additive combining means for compression mode and to said subtractive combining means for expansion mode.

19. A signal processing system according to claim 1 comprising switch means for disabling said further path, whereby the processing action of said system can be disabled and said system transfers said input signals to the output in a substantially proportional manner.

20. A signal processing system for producing an output signal in response to an input signal comprising a main signal path responsive to said input signal and including means for providing in a specified frequency band a first signal substantially proportional to said input signal;

a further signal path coupled to said main signal path and responsive to a signal derived from said main signal path for producing a second signal in said specified frequency band, and signal combining means for combining said first and second signals to produce said output signal, said further signal path including a first filter having fixed-value components for providing high-pass characteristics with a cutoff frequency within said specified frequency band; and means for limiting the amplitude of the output signal of the further signal path; said means including a second filter connected in cascade with said first filter and having variable cutoff characteristics;

said second filter including a variable impedance means responsive to an increase in the amplitude of at least one of the output of and the input to said further signal path for altering said cutoff characteristics from passing substantially all frequencies in said specified frequency band under low-level input signal conditions to progressively passing only the high frequencies therein, and providing a cutoff frequency which shifts upwards sufficiently to attenuate, in combination with the said high-pass characteristics of said first filter, any high-level input signal components at any given frequency in said specified frequency band to a specified level corresponding in said second signal to a small fractional part of the maximum level of said input signal, while permitting input signal components below said specified level at higher frequencies than said given frequency to pass through said filters and to appear in said second signal with a lesser degree of attenuation.

21. A signal processing system according to claim 26 comprising means responsive to the output of said further signal path to control the impedance of said variable impedance means as a function of frequency such that said small fractional part decreases as said given frequency increases.

22. A signal processing system according to claim 20 wherein said further signal path is responsive to said input signal; and wherein said signal combining means additively combines said first signal and said second signal, whereby said signal processing system operates as a compressor.

23. In a tape recorder, for approximately correcting the high-frequency emphasis introduced by a signal compressor in accordance with claim 22 to the signal as recorded on a tape being played back by said recorder, the improvement consisting in a passive equalization network for approximately correcting said emphasis, the network comprising a series resistance followed by a shunt arm which includes a resistor and capacitor in series.

24. A signal processing system according to claim 20 wherein said further signal path is responsive to said output signal; and wherein said signal combining means subtractively combines said second signal and said first signal, whereby said signal processing system operates as an expander.

25. A signal processing system according to claim 20 comprising switch means for selecting the compression or expansion operating mode of said system;

said main signal path including subtractive combining means followed by additive combining means;

said further signal path being responsive to the output of said subtractive combining means; and said switch means coupling said second signal to said additive combining means for compression mode and to said subtractive combining means for expansion mode.

26. A signal processing system according to claim 20 comprising switch means for disabling said further path, whereby the processing action of said system can be disabled and said system transfers said input signal to the output in a substantially proportional manner.

27. A method of processing an input signal to modify the dynamic range thereof, wherein first and second signal components are derived in response to said input signal and combined to form an output signal;

said first signal component being substantially proportional to said input signal within a frequency band extending between first and second limits; and said second signal component being subjected to the action of a first filter having a fixed cutoff frequency lying between said first and second limits and passing signals between said first limit and said cutoff frequency and the action of a second filter having a variable cutoff frequency which is shifted progressively away from said second limit as said second signal component tends to increase, thereby to limit said second signal component to a small fractional part of said first signal component when said input signal is at maximum level.

* * * * *